[72] Inventor Rainer Mallebrein
Singen, Hohentwiil, Germany

[21] Appl. No. 676,884
[22] Filed Oct. 20, 1967
[45] Patented Aug. 3, 1971
[73] Assignee Telefunken Patentverwertungsgesellschaft m.b.H.
Ulm/Danube, Germany
[32] Priority Oct. 20, 1966
[33] Germany
[31] T 32323

[54] CODE GENERATOR FOR FEEDING DATA INTO A TELEPHONE CHANNEL
5 Claims, 8 Drawing Figs.

[52] U.S. Cl. ........ 179/2 DP, 179/2 A
[51] Int. Cl. ........ H04m 11/06
[50] Field of Search ........ 179/6 R, 2 R, 2 DP, 1 C, 2 C

[56] References Cited

UNITED STATES PATENTS

| | | | |
|---|---|---|---|
| 3,360,071 | 12/1967 | Vogelman | 181/.5 |
| 3,299,207 | 1/1967 | Cooke | 179/1 |
| 3,180,937 | 4/1965 | Moser | 179/1 |
| 3,130,270 | 4/1964 | Sanders | 179/1 |
| 2,847,506 | 8/1958 | Gray | 179/1 |
| 3,384,713 | 5/1968 | Duncan | 179/2 |
| 3,383,467 | 5/1968 | New et al. | 179/2 |
| 3,305,635 | 2/1967 | Kadis | 178/66 |
| 3,381,276 | 4/1968 | James | 179/2 |
| 3,371,162 | 2/1968 | Scantlin | 179/2 |
| 3,277,243 | 10/1966 | Fairbairn | 179/1 |

OTHER REFERENCES

IBM Technical Disclosure " Remote Inquiry System" Vol. 1 No. 4 Dec. 1958

*Primary Examiner*—William C. Cooper
*Assistant Examiner*—Tom D'Amico
*Attorney*—Spencer & Kaye

ABSTRACT: A portable code generator for feeding data into computers via a telephone channel and including different audio frequency oscillators actuated to deliver pulses via a dial or a keyboard, the oscillations being transmitted into a telephone instrument via a speaker attached to the mouthpiece of the telephone and then being fed to the computer.

INVENTOR
Rainer Mallebrein

BY Spencer & Kaye
ATTORNEYS

INVENTOR.
Rainer Mallebrein
BY Spencer & Kaye
ATTORNEYS

CODE GENERATOR FOR FEEDING DATA INTO A TELEPHONE CHANNEL

BACKGROUND OF THE INVENTION

The present invention relates to a code generator for feeding data into digital computers or storage devices via a telephone channel.

In electronic computers, the data are usually read in from an operator's desk by means of keys or a typewriter so that the presence of operating personnel at the apparatus is required.

Methods have already been suggested for permitting data to be fed into computers from different locations utilizing the public teletype net, as well as methods which permit data to be fed into a machine through telephone lines. Such devices, however, are very expensive and furthermore have the disadvantage that each must be permanently installed at a prescribed location. In many cases it is desirable to enable several persons to read data into computers from as many different locations as possible. This occurs, for example, in the transmission of purchasing and sales orders by field representatives to a distribution center and in the operation of automatic reservation systems.

SUMMARY OF THE INVENTION

It is a primary object of the present invention to facilitate the transmission of digital data over standard telephone lines.

Another object of the present invention is to permit digital data to be readily transmitted from any telephone instrument.

A further object of the present invention is to permit such telephone instruments to be so employed without requiring any modifications.

Still another object of the present invention is to provide a readily portable digital code generator for producing such data and for supplying to the telephone instrument.

A still further object of the invention is to provide such a code generator which is extremely simple to operate.

These and other objects according to the present invention are achieved by the provision of a portable code generator for delivering data in digital form to an installation via a telephone system. The generator according to the invention includes acoustic signal-producing means, mounting means carrying the signal producing means and arranged for securely mounting the signal-producing means on the mouthpiece of a standard telephone so that the producing means are in acoustic communication with the mouthpiece microphone, and signal-generating means for generating audio frequency signals and for coding these signals according to the information to be delivered, the generating means being connected to the signal-producing means for delivering the coded audio frequency signals to the input of the signal-producing means.

According to a preferred embodiment of the present invention, the signal-generating means include oscillator means for generating an audio frequency signal having at least a first fixed frequency, switch means connected to the oscillator for controlling the delivery of such audio frequency signal to the acoustic signal producing means, and coding means connected to control the opening and closing of the switch means for intermittently applying such audio frequency signals to the signal producing means according to a predetermined code.

DESCRIPTION OF THE PREFERRED EMBODIMENTS

Figure 1:
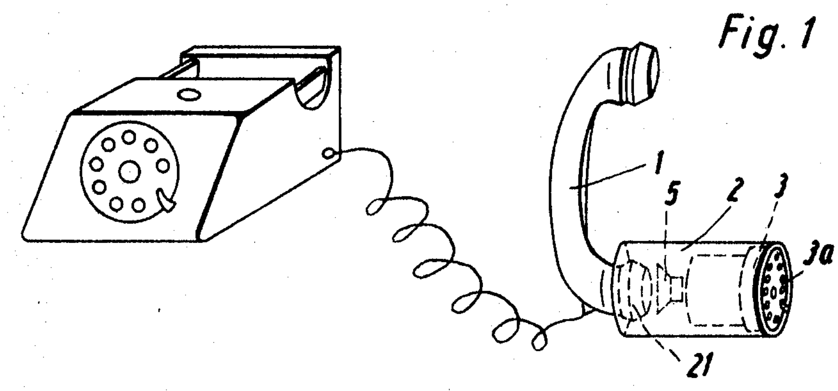
FIG. 1 is a pictorial view showing one configuration of the code generator of the present invention and its attachment to the handset of a telephone.

FIG. 1 shows one particular embodiment of the device according to the present invention. The code generator 2 is in the form of a cylindrical, easily transportable instrument one end of which can be slipped around the mouthpiece 21 containing the microphone of the handset 1 of a telephone. The other end, or frontal face, of the code generator 2 is provided with a dial 3*a* of a known type arranged to actuate the contacts of a dialing device 3 similar to that of a standard telephone. The cylindrical housing of the code generator is preferably provided, at the end facing the mouthpiece 21, with stop springs or rubber pads which slide over the annular portion of the mouthpiece casing when the code generator is attached thereto for holding it in the proper position and establishing a good acoustic communication between the telephone microphone and the code generator speaker 5.

Figure 2:
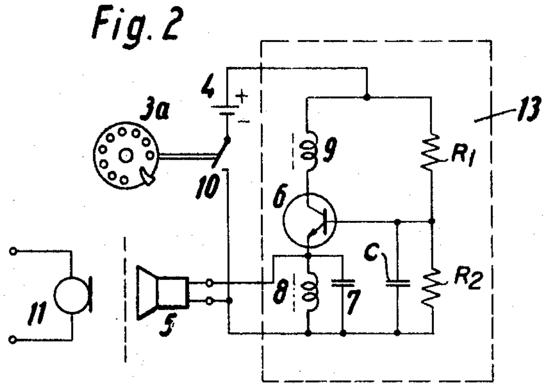
FIG. 2 is a circuit diagram of one embodiment of the code generator of the invention.

FIG. 2 shows one electrical circuit which can be employed in the code generator and which includes an audio frequency oscillator 13 fed by a dry cell battery 4 and arranged to have its output signals transmitted to the speaker 5.

A resonant circuit composed of the parallel connection of a capacitor 7 and a coil 8 is connected in the emitter circuit of a transistor 6 having a constant voltage bias applied to its base. The coil 8 is inductively coupled to a further coil 9 which is disposed in the collector circuit of transistor 6 so that fluctuations in the current generated in coil 9 by the collector current will induce in-phase voltage fluctuations within the resonant circuit coil 8 so that an undamped oscillation results at a frequency determined by the resonant circuit. The circuit also includes resistors $R_1$ and $R_2$ and capacitor C whose values are selected in the usual manner. A contact 10 is arranged to be opened and closed cyclically during the rotation of the dial 3*a* of the dialing device 3 so as to cause the operating potential from battery 4 to be applied in a similar manner to the oscillator, which is thus intermittently actuated. The resulting audio signals produced by the speaker 5 travel through the microphone 11 of the handset to the telephone line.

For the transmission of information, the code generator 2 is pushed onto the mouthpiece 21 of the handset 1 after the latter has been removed from the telephone cradle. A telephone connection to the data-receiving device is established in the usual manner, i.e., by dialing the proper number by means of the telephone set dial. Once the connection has been established, a ringing signal from the digital instruction receiver sounds in the speaker of the handset.

The calling person can then deliver data by operating the dial 3*a* of the code generator 2, a different data signal being produced by each rotation of the dial. During each rotation of the dial, the oscillator 13 is excited according to the pulse pattern created by contact 10, for example, under the control of a cam plate connected to the dial, each degree of rotation of dial 3*a* producing a different pulse pattern, and the thus resulting dialed audio frequency pulse pattern is fed into the speaker 5 which transmits the pulses through the telephone connection to the digital instruction receiver. According to one basic arrangement, each dialing operation causes switch 10 to be cyclically opened and closed a number of times proportional to the amount by which dial 3*a* is rotated.

Figure 3:
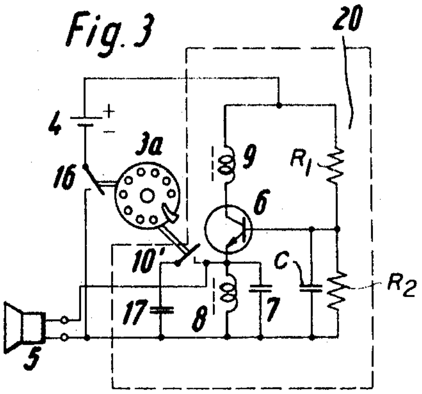
FIG. 3 is a circuit diagram of another embodiment of the present invention.

A suitable variation of the circuit arrangement of FIG. 2 is shown in FIG. 3 where an oscillator 20 is capable of generating two different frequencies. A switch 16 is connected in series with the battery 4 and is arranged to be closed as long as the dial device 3*a* is not in its rest, or starting, position. The oscillator therefore delivers, during the periods when dial 3*a* is not at rest and when switch 10′ is open, an audio signal, whose frequency is determined by the values of capacitor 7 and coil 8, to the speaker 5 whose input is connected to coil 8.

During the pulse periods when the switch 10′, which is cyclically operated by the dialing device 3, is closed, the frequency of the resonant circuit is altered by the addition of a further capacitor 17 so that at the speaker 5 there appears a signal whose frequency alternates between the resonant frequency of resonant circuit 7, 8 and that of circuit 7, 17, 8. The number of frequency alternations and/or the position in time and/or duration of each frequency pulse forms the elements of the code. Upon completion of one pulse sequence and return of dial 3*a* to rest, switch 16 disconnects both resonant circuits from the current supply 4.

Figure 4:
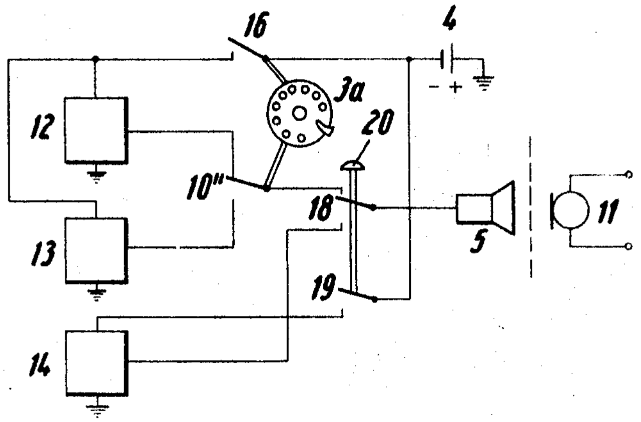
FIG. 4 is a circuit diagram of a further embodiment of the code generator of the present invention.

Another embodiment of the code generator is shown in FIG. 4 to include two oscillators 12 and 13 which produce outputs having frequencies $f_1$ and $f_2$, respectively, and which have their power inputs connected in parallel. Each oscillator has its output connected to a respective contact of a switch 10″ which is in turn connected to the normally closed contact of a switch 18. As long as switch 18 remains in the position shown, one or the other of oscillators 12 and 13 will at all times have its output connected to the speaker 5. A switch 16 connects the oscillator inputs with the dry cell battery 4. This switch is closed whenever the dial 3*a* is rotated away from its rest position and is open when the dial is in its rest position.

A third oscillator 14, which oscillates at a frequency $f_3$, has its output connected to the normally open contact of switch 18 and its input connected to the normally open contact of switch 19. Switches 18 and 19 are mechanically coupled to an end key 20 and when this key is depressed the input of oscillator 14 is connected to the operating voltage source 4 and the output of the oscillator is connected to speaker 5.

As in the embodiment of FIG. 3, the frequencies $f_1$ and $f_2$ will alternatingly appear at the speaker 5 in synchronism with pulses and intervals between the pulses, respectively, produced by dialing device 3 as dial 3*a* rotates. When the dialing device is wound, or rotated away from its rest position to any selected dialed position, the operating potential from source 4 is applied to oscillators 12 and 13 and a signal from oscillator 12 at frequency $f_1$ becomes audible at the speaker 5. After the dial has been released, and as it returns to its rest position, the signal having the frequency $f_1$ is intermittently interrupted and replaced by the signal from oscillator 13 having the frequency $f_2$, the number of frequency alternations being a function of the amount of rotation to which dial 3*a* is subjected. When the dialing device 3 has completely run down so that dial 3*a* is in its rest position, switch 16 opens so that both oscillators are turned off. This procedure can be repeated as often as desired according to the number of digits to be dialed. The end of a transmission can be indicated by depressing key 20 so as to cause a signal pulse having a frequency of frequency $f_3$ to be delivered to the speaker by oscillator 14.

It is also possible to indicate the end of a transmission, for example, by dialing a selected multiple-digit code number, thereby eliminating the need for oscillator 14.

Dialing device 3 can be provided with various arrangements for controlling the opening and closing of the oscillator control switch 10, 10′ or 10″. For example, a toothed cam wheel having a number of teeth equal to the number of dialing positions, or dialing digits, can be associated with the dial so as to remain stationary while the dial is being rotated to a given position and to then rotate with the dial as it returns to its rest position. The switch to be operated can be operatively associated with the cam so as to open and close in response to the movement of the cam teeth past a given point, the cam always reaching a point at which it maintains the switch in its normally open position when the dial reaches its rest position. This arrangement thus causes the number of switching cycles to be directly proportional to the amount of rotation imparted to the dial during each dialing operation.

Figures 5A, 5B:
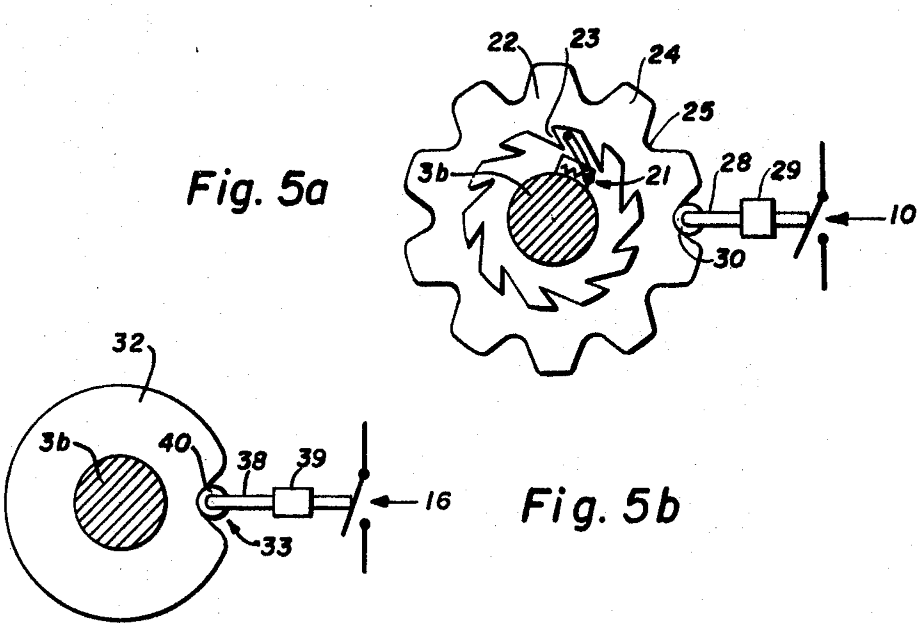
FIG. 5*a* is a partly cross-sectional view of one form of construction of a dialing device for use in the present invention.
FIG. 5*b* is a view similar to that of FIG. 5*a* of another portion of such dialing device.

FIG. 5*a* shows one form which such an arrangement can take. The shaft 3*b* on which dial 3*a* is rigidly mounted also carries an engaging mechanism 21 consisting of a pivotally mounted pawl element and a weak biassing spring arranged to urge the outer end of the pawl element outwardly. This pawl element is arranged to engage ratchet teeth 23 extending from the inner periphery of a cam wheel 22. The outer periphery of wheel 22 is provided with projecting portions 24 separated by recesses 25 and is arranged to control the movement of a switch, such as switch 10, through the intermediary of a switch actuating pin 28 slidably supported by a bearing 29 and carrying a roller follower 30 which can ride along the projections 24 and recesses 25 constituting the camming surface of wheel 22. The wheel 22 is mounted to rotate freely about shaft 3*b*. Pin 28 may be spring biassed toward the position shown or it can be normally urged into this position by the biassing associated with switch 10.

When the dial is in its rest position, mechanism 21 is in the position shown and follower 30 is engaged in a recess 25 so that switch 10 is open. Then, when the dial is rotated to a particular dialing position, mechanism 21 is also rotated in a clockwise direction to a corresponding position. During this rotation, the pawl element rides over ratchet teeth 23 and wheel 22 remains stationary.

After the dial has been advanced to the desired position, it is released and returns to its rest position. This involves a counterclockwise rotation of the dial, the shaft 3*b*, and mechanism 21. As soon as this return rotation commences, the pawl element engages one of the teeth 23 and causes wheel 22 to rotate together with the dial. Thus wheel 22 rotates through substantially the same angle as the dial during the return rotation of the latter. As wheel 22 rotates, follower 30 rides along projections 24 and recesses 25, imparting a reciprocatory movement to pin 28 and hence cyclically closing and opening switch 10. It will be readily apparent that the number of such openings and closings will be proportional to the amount of rotation imparted to the dial during each dialing operation.

FIG. 5*b* shows a further arrangement which can be used in conjunction with that of FIG. 5*a* for operating the switch 16 of FIGS. 3 or 4. This arrangement includes a cam wheel 32 rigidly connected for rotation with shaft 3*b* and having a circular camming surface interrupted by a single recess 33. A switch-actuating unit is interposed between switch 16 and wheel 32 and includes a switch-actuating pin 38 slidably supported in a bearing 39 and carrying a roller follower 40 arranged to ride on the camming surface of wheel 32. Pin 38 can be spring biassed into the position shown.

The switch actuating unit is positioned so that follower 40 will engage recess 33, and switch 16 will be open, when the dial is in its rest position. When the dial is rotated out of its rest position, and as long as it remains out of that position, wheel 32 will move pin 38 to the right and maintain switch 16 closed.

It should be appreciated that the arrangements shown in FIGS. 5*a* and 5*b* are merely exemplary and that many other types of arrangements could be used and that the mechanical cam-switch structure could be entirely replaced by an electrical switching arrangement composed of a plurality of conductive contacts mounted on a wheel or disc arranged to rotate in the same manner as wheel 22 or wheel 32.

Figure 6A:
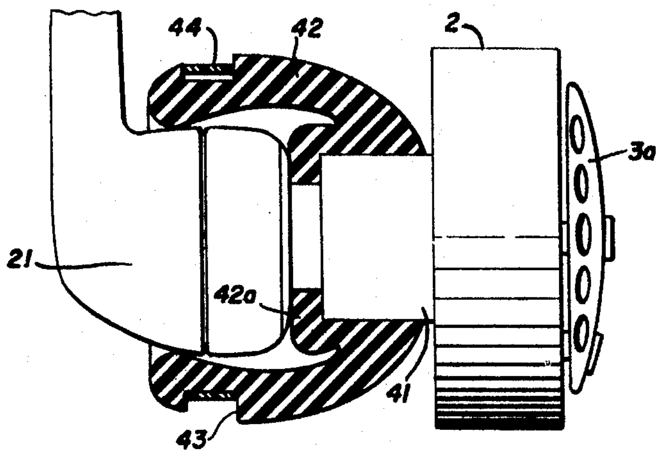
FIG. 6*a* is a partly sectional view showing the mouthpiece of the handset of a telephone with the code generator of the present invention attached, the sectional view showing one form of construction of the attachment means.

FIG. 6*a* shows the mouthpiece 21 of a handset of a telephone and a code generator 2 attached thereto. The frontal face of the code generator 2 bears the dial 3*a*, the rear part of the code generator consists of a cylindrical housing 41 bearing an annular sleeve of rubber 42 with a free orifice which can be slipped around the mouthpiece and which, in its end position as shown, is in a dilatated state and so under stress. The end position is reached when an annular portion 42*a* of the rubber sleeve 42 projecting in its interior bears against the front face of the mouthpiece 21. It can be convenient to provide, on the periphery of the sleeve 42 and near to its orifice, an annular groove 43 containing a strainer strap 44 which can be strained by a gripping lever (not shown).

Figure 6B:
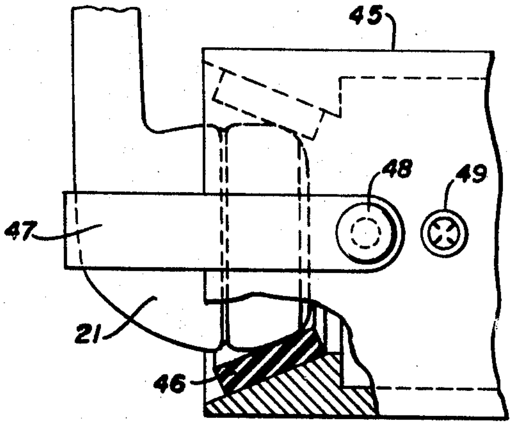
FIG. 6*b* is a view similar to that of FIG. 6*a* showing another form of construction of the attachment means.

According to FIG. 6*b*, which shows another form of attachment means, the rear portion of the code generator is a metal cylinder 45 with an annular layer of rubber, forming a conical inner end face 46. This face is brought into contact with the circumference of the mouthpiece 21. An extensible belt 47, one end of which is fixed on cylinder 45, is then laid around the back of the mouthpiece 21 and the free end of the belt is fastened to the cylinder 45 by means of a snap button fastener 48, so that the belt forms a loop which is under stress to hold the code generator in its attached position. Several snap buttons (one second shown at 49) can be provided on the cylinder 45, staggered in longitudinal direction, to adapt the length and the stress of the belt loop.

A number of variations of the devices described above can be realized. Thus, for example, the dialing device 3 can be replaced by a keyboard or the data can be fed in by means of a code carrier in the form of a punched tape which is prepared with a simple additional device. One end of this tape can be inserted, for example, into the code generator and can then be pulled therethrough, by means of a mechanism provided within the code generator, thus controlling the oscillators. One such mechanism for both feeding the tape and reading it is disclosed in Volume 2 of the *Handbook of Automation, Computation, and Control* which volume is entitled "Computer and Data Processing," (John Wiley & Sons, Inc., New York, 1959), pages 20—23, 20—24, 20—26and 20—27. In conjunction with a dial as illustrated in the above embodiments, readily interchangeable cam plates for operating the switches 10, 10' and 10'' and having various ratios of tooth length to gap length can be provided. It might also be useful to use a secret combination of numbers to actuate the apparatus at the receiving end and thus to prevent unauthorized use.

While maintaining, or even improving, the portability of the device, it is also possible to install its components in two separate housings which are connected only by an electric line. For example, the speaker could be disposed separately in a small case which can be attached to the mouthpiece of the telephone and the other components of the code generator could be housed, together with the operating devices, in a second case which is places on a table, for example, when the set is being operated.

It will be understood that the above description of the present invention is susceptible to various modifications, changes and adaptations, and the same are intended to be comprehended within the meaning and range of equivalents of the appended claims.

I claim:

1. A portable data code generator for delivering data in digital form to an installation via a telephone system, comprising in combination:

a. acoustic signal-producing means responsive to electrical signals;

b. mounting means carrying said signal-producing means and arranged for attaching said signal-producing means to the mouthpiece of a standard telephone so that said producing means are in acoustic communication with the mouthpiece microphone;

c. signal-generating means for generating electrical audio frequency signals and for coding these signals according to the information to be delivered, said generating means being connected to said signal producing means for delivering the coded audio frequency signals to the input of said signal-producing means, said signal-generating means comprising: oscillator means for generating audio frequency signals at two different fixed frequencies; switch means connected to said oscillator for controlling the delivery of such audio frequency signal to said acoustic signal producing means; and coding means connected to control the opening and closing of said switch means for intermittently applying such audio frequency signals to said signal producing means according to a predetermined code, the code produced by said coding means for each bit of information being constituted by periodic pulses; said switch means being arranged for delivering a signal at one of the two fixed frequencies for the duration of each such pulse, for delivering a signal at the other of the two different frequencies during the periods when no such pulse is present, and for interrupting the supply of operating power to said oscillator means when said coding means are inactive;

d. an auxiliary oscillator for generating an audio frequency signal at a further frequency;

e. further switch means for connecting the output of said auxiliary oscillator to said signal-producing means; and f. switch-operating means connected to said further switch means for delivering the signal from said auxiliary oscillator to said signal-producing means to signal the end of data transmission.

2. An arrangement as defined in claim 1 wherein said mounting means include a sleeve portion which fits tightly around the telephone mouthpiece when said mounting means are attached to the mouthpiece for isolating the mouthpiece from sounds other than those produced by said signal producing means.

3. An arrangement as defined in claim 1 wherein said code generator is constructed for receiving a punched tape coded according to the data to be delivered, and said signal-generating means are constructed for responding to the holes in such tape for producing the desired coding.

4. An arrangement as defined in claim 1 wherein said coding means are mounted in said code generator in such a manner as to be interchangeable with other coding means.

5. An arrangement as defined in claim 4 wherein said coding means comprises a cam disc rotatably mounted in said code generator and having a camming surface presenting a plurality of spaced projecting portions separated by recesses, said camming surface being associated with said switch means for causing each projecting portion to place said switch means in one of its switching states and each recess to place said switch means in the other of its switching states.